(12) United States Patent
Bone et al.

(10) Patent No.: US 10,981,484 B2
(45) Date of Patent: Apr. 20, 2021

(54) COLLAPSIBLE CUP HOLDER

(71) Applicant: GM Global Technology Operations LLC, Detroit, MI (US)

(72) Inventors: Jason C. Bone, Clarkston, MI (US); Scott J. Fast, Macomb, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 69 days.

(21) Appl. No.: 16/522,102

(22) Filed: Jul. 25, 2019

(65) Prior Publication Data
US 2021/0023973 A1    Jan. 28, 2021

(51) Int. Cl.
*B60N 3/10* (2006.01)

(52) U.S. Cl.
CPC .................... *B60N 3/102* (2013.01)

(58) Field of Classification Search
CPC ....................................... B60N 3/102
USPC ....................................... 248/316.4
See application file for complete search history.

(56) References Cited

U.S. PATENT DOCUMENTS

| | | | | |
|---|---|---|---|---|
| 4,892,281 A * | 1/1990 | DiFilippo | ............. | B60N 3/102 248/240.1 |
| 5,487,519 A * | 1/1996 | Grabowski | ............. | B60N 3/102 224/281 |
| 5,505,516 A * | 4/1996 | Spykerman | ............. | B60N 3/102 248/311.2 |
| 5,620,228 A * | 4/1997 | Ito | ............. | A47C 7/68 297/188.17 |
| 6,450,468 B1 * | 9/2002 | Hamamoto | ............. | B60N 3/108 248/311.2 |
| 6,702,241 B2 * | 3/2004 | Harada | ............. | B60N 3/102 224/483 |
| 2005/0194506 A1 * | 9/2005 | Lang | ............. | B60N 3/102 248/311.2 |
| 2013/0008932 A1 * | 1/2013 | Shindo | ............. | B60N 3/102 224/483 |
| 2013/0082492 A1 * | 4/2013 | Andersson | ............. | B60N 3/108 297/188.17 |

FOREIGN PATENT DOCUMENTS

| | | | | |
|---|---|---|---|---|
| KR | 100666569 | * | 1/2007 | ............. B60N 3/106 |
| KR | 20160106523 | * | 9/2016 | |

* cited by examiner

*Primary Examiner* — Jason S Morrow
*Assistant Examiner* — Kevin P Weldon

(57) ABSTRACT

A collapsible cup holder for an automobile comprises a base, a tray slidably supported on the base and slidable between an extended position, wherein the tray extends laterally outward from the base, and a recessed position, wherein the tray is recessed within the base, and a cup support slidably supported on the tray and slidable between an open position relative to the tray, wherein the cup support and the tray define a space adapted to removably receive a beverage container, and a closed position relative to the tray, wherein when the tray is moved from the extended position to the recessed position, the cup support is adapted to move from the open position to the closed position, and to fit within the base in an overlapping relationship with the tray.

19 Claims, 6 Drawing Sheets

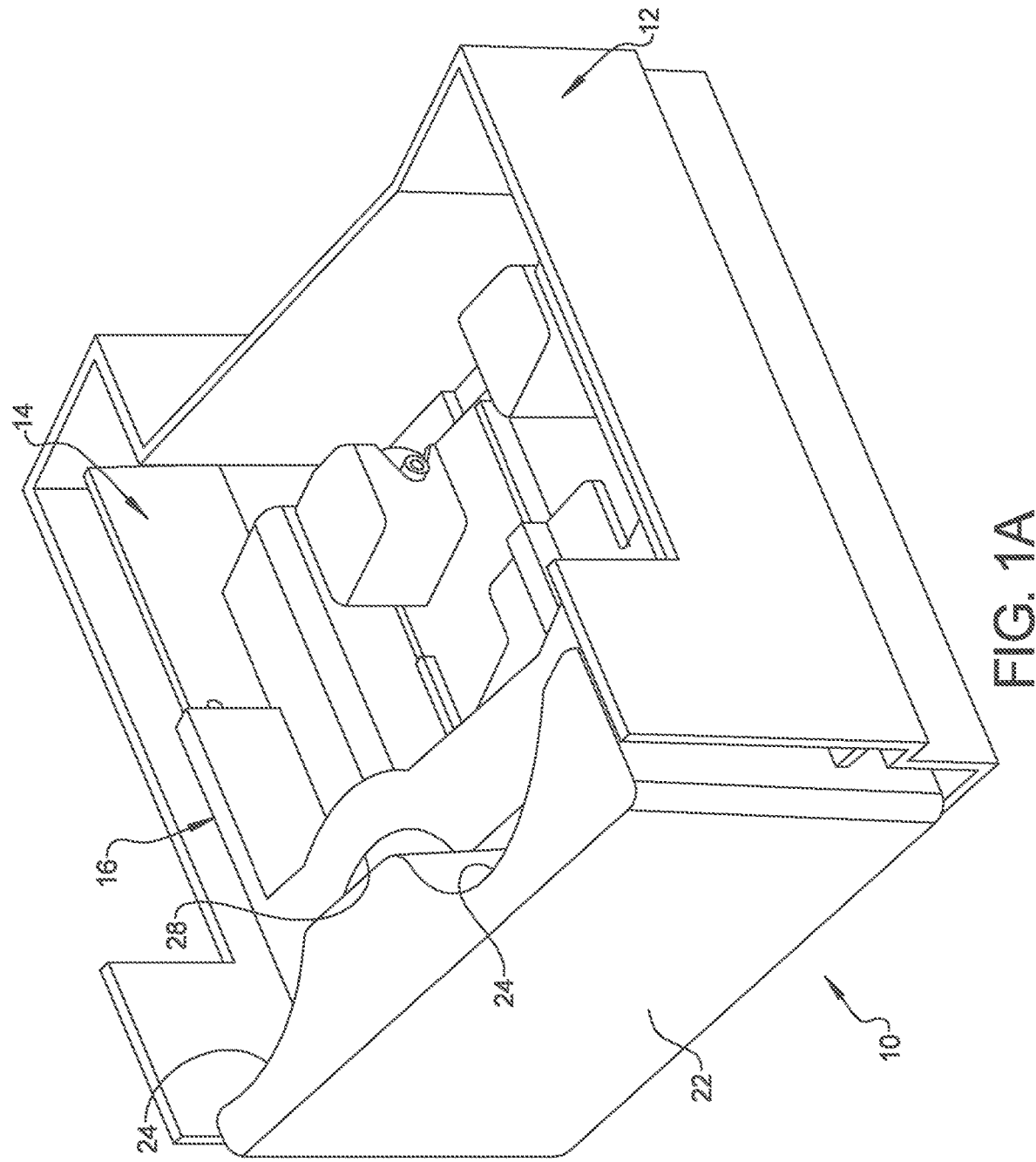

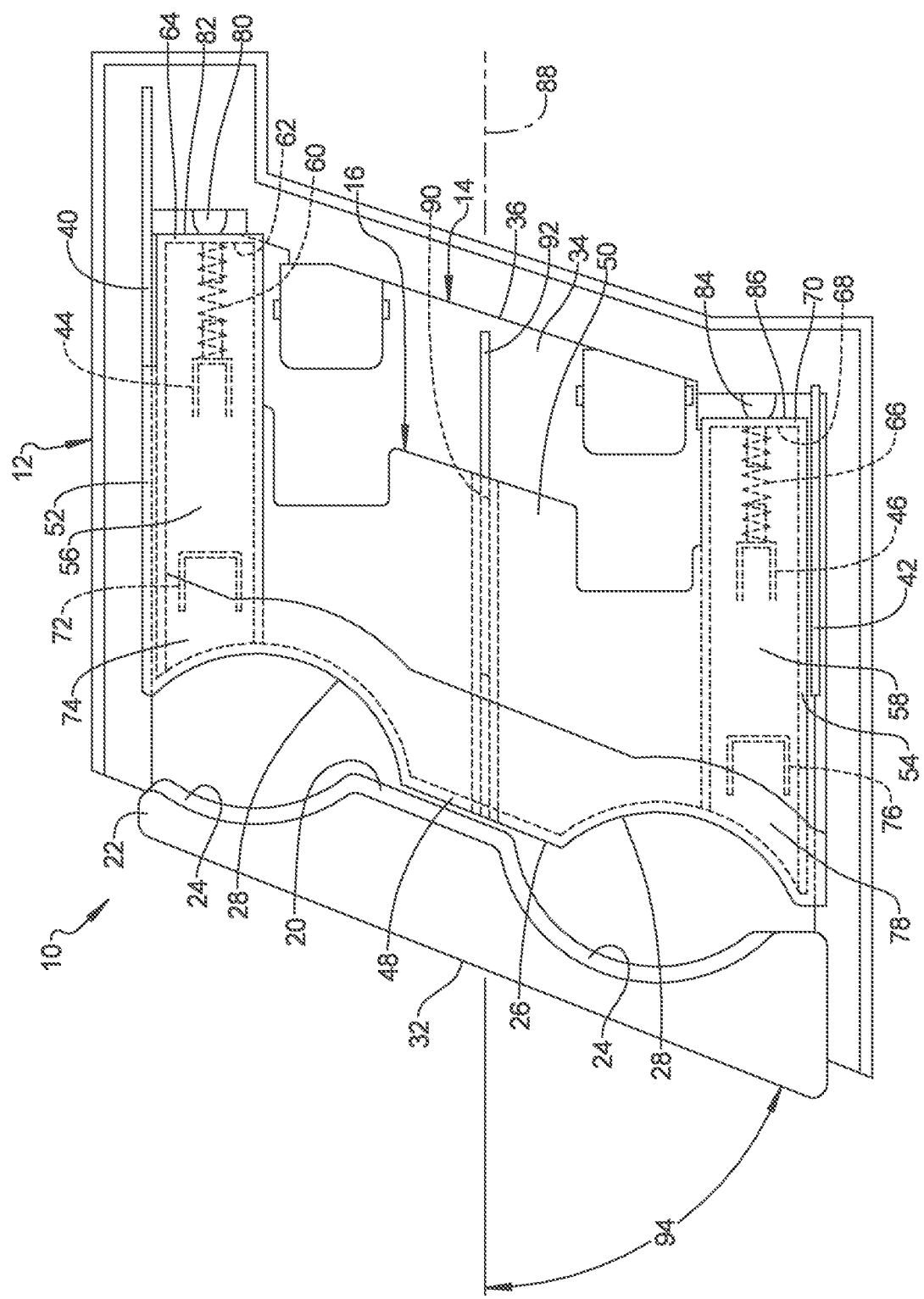

COLLAPSIBLE CUP HOLDER

INTRODUCTION

The present disclosure relates to a cup holder for an automobile that retracts within the dash-board of the automobile when not in use.

To maximize space within an automobile cup holders have been designed that retract within the instrument panel, out of the way of the drive of a vehicle, when not in use. In order to allow this, space must be allocated behind the instrument panel to accommodate the cup holder when the cup holder is retracted.

Therefore, while current cup holders achieve their intended purpose, there is a need for a new and improved cup holder that collapses within the instrument panel, and takes up less space behind the instrument panel when recessed therein.

SUMMARY

According to several aspects of the present disclosure, a collapsible cup holder for an automobile comprises a base, a tray slidably supported on the base and slidable between an extended position, wherein the tray extends laterally outward from the base, and a recessed position, wherein the tray is recessed within the base, and a cup support slidably supported on the tray and slidable between an open position relative to the tray, wherein the cup support and the tray define a space adapted to removably receive a beverage container, and a closed position relative to the tray, wherein when the tray is moved from the extended position to the recessed position, the cup support is adapted to move from the open position to the closed position, and to fit within the base in an overlapping relationship with the tray.

According to another aspect of the present disclosure, the base includes a stop adapted to engage the cup support, wherein when the tray is moved from the extended position toward the recessed position, the tray and the cup support move unitarily relative to the base until the cup support contacts the stop, and further movement of the tray toward the recessed position after the cup support contacts the stop causes the cup support to move relative to the tray, and when the tray is moved to the recessed position within the base, the cup support is in the closed position relative to the tray.

According to another aspect of the present disclosure, the stop is made from a compressible material to provide a soft contact when the cup support engages the stop.

According to another aspect of the present disclosure, the collapsible cup holder further includes a latching mechanism mounted within the base and adapted to engage the tray when the tray is moved to the recessed position.

According to another aspect of the present disclosure, the collapsible cup holder further includes a first spring positioned between the cup support and the tray, the first spring adapted to bias the cup support to the open position.

According to another aspect of the present disclosure, the tray includes a bottom plate having a front, a rear, a first side, a second side, a first spring support extending vertically from a top surface of the bottom plate adjacent the first side of the tray, and a second spring support extending vertically from the top surface of the bottom plate adjacent the second side of the tray, the cup support including a front, a rear, a first side, a second side, a first channel extending parallel to and adjacent the first side of the cup support, a second channel extending parallel to and adjacent the second side of the cup support, a first spring positioned within the first channel between the first spring support and an inner surface of a first end of the first channel, and a second spring positioned within the second channel between the second spring support and an inner surface of a first end of the second channel, wherein, the first spring support extends vertically into the first channel and the second spring support extends vertically into the second channel, the first and second springs adapted to bias the cup support to the open position relative to the tray.

According to another aspect of the present disclosure, the first channel includes a first contact formed at a second end of the first channel and the second channel includes a second contact formed at a second end of the second channel, the first contact adapted to engage the first spring support and the second contact adapted to engage the second spring support when the cup support is in the open position relative to the tray.

According to another aspect of the present disclosure, the base includes a first stop adapted to engage an outer surface of the first end of the first channel of the cup support when the cup support is in the closed position and a second stop adapted to engage an outer surface of the first end of the second channel of the cup support when the cup support is in the closed position, wherein, when the tray is moved from the extended position toward the recessed position, the tray and the cup support move unitarily relative to the base until the cup support contacts the first and second stops, and further movement of the tray toward the recessed position after the cup support contacts the first and second stops causes the cup support to move relative to the tray, and when the tray is moved to the recessed position within the base, the cup support is in the closed position relative to the tray.

According to another aspect of the present disclosure, the first and second stops are made from a compressible material to provide a soft contact when the cup support engages the stop.

According to another aspect of the present disclosure, the collapsible cup holder further includes at least one constant force extension spring positioned between the tray and the base and adapted to bias the tray toward the extended position relative to the base.

According to another aspect of the present disclosure, the tray includes a bottom plate having a front, a rear, a first side, a second side, and a center channel formed within the bottom plate, and the cup support includes a vertically extending ridge that is slidably received within the center channel formed within the bottom plate of the tray to maintain alignment of the tray and the cup support.

According to another aspect of the present disclosure, the tray and the cup support are slidable along a longitudinal horizontal axis.

According to another aspect of the present disclosure, the front surface of the tray defines an angle relative to the longitudinal horizontal axis that is less than 90 degrees.

According to another aspect of the present disclosure, the collapsible cup holder further includes a pair of constant force extension springs, a first constant force extension spring being mounted on the bottom plate of the tray, adjacent the rear of the bottom plate between the first side of the bottom plate and the center channel, a second constant force extension spring being mounted on the bottom plate of the tray, adjacent the rear of the bottom plate between the second side of the bottom plate and the center channel, the first and second constant force extension springs being adapted to bias the tray to the extended position relative to the base.

According to several aspects of the present disclosure, a collapsible cup holder for an automobile comprises a base, a tray, the tray including a bottom plate having a front, a rear, a first side, a second side, a first spring support extending vertically from a top surface of the bottom plate adjacent the first side of the tray, and a second spring support extending vertically from the top surface of the bottom plate adjacent the second side of the tray, the tray slidably supported on the base and slidable between an extended position, wherein the tray extends laterally outward from the base, and a recessed position, wherein the tray is recessed within the base, a cup support slidably supported on the tray and slidable between an open position relative to the tray, wherein the cup support and the tray define a space adapted to removably receive a beverage container, and a closed position relative to the tray, the cup support including a front, a rear, a first side, a second side, a first channel extending parallel to and adjacent the first side of the cup support, a second channel extending parallel to and adjacent the second side of the cup support, a first spring positioned within the first channel between the first spring support of the tray and an inner surface of a first end of the first channel, and a second spring positioned within the second channel between the second spring support of the tray and an inner surface of a first end of the second channel, the first spring support extending vertically into the first channel and the second spring support extending vertically into the second channel, the first and second springs adapted to bias the cup support to the open position relative to the tray, a latching mechanism mounted within the base and adapted to engage the tray when the tray is moved to the recessed position, a pair of constant force extension springs, a first constant force extension spring being mounted on the bottom plate of the tray, adjacent the rear of the bottom plate between the first side of the bottom plate and the center channel, a second constant force extension spring being mounted on the bottom plate of the tray, adjacent the rear of the bottom plate between the second side of the bottom plate and the center channel, the first and second constant force extension springs being adapted to bias the tray to the extended position relative to the base, wherein when the tray is moved from the extended position to the recessed position, the cup support is adapted to move from the open position to the closed position, and to fit within the base in an overlapping relationship with the tray.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 1a is a perspective view of a collapsible cup holder according to an exemplary embodiment;

FIG. 2 is a top view of the collapsible cup holder shown in FIG. 1b;

DETAILED DESCRIPTION

The following description is merely exemplary in nature and is not intended to limit the present disclosure, application, or uses.

Figure 1B:
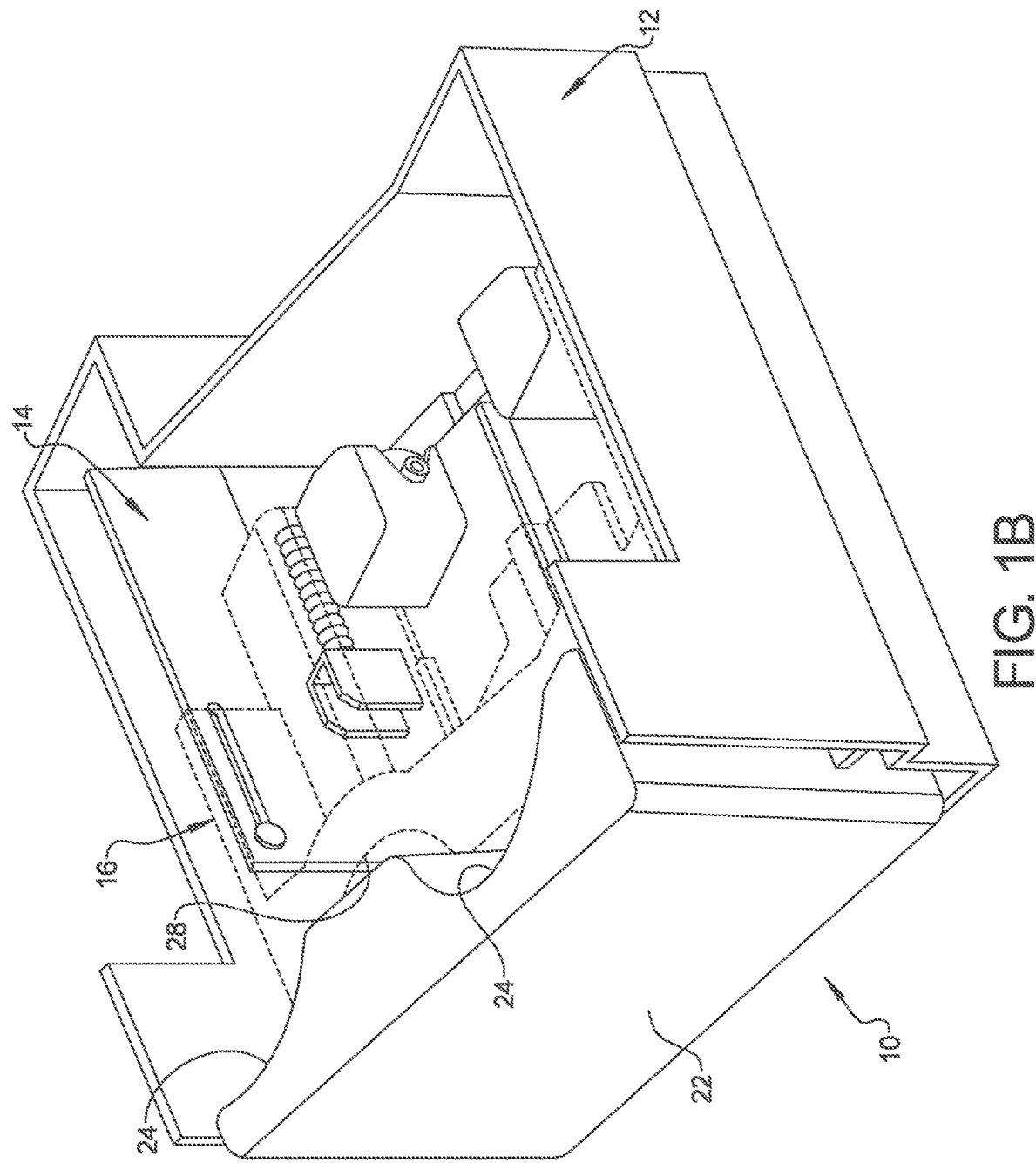
FIG. 1b is a perspective view of the collapsible cup holder shown in FIG. 1a, wherein a cup support is shown in shadow.
Figure 3:
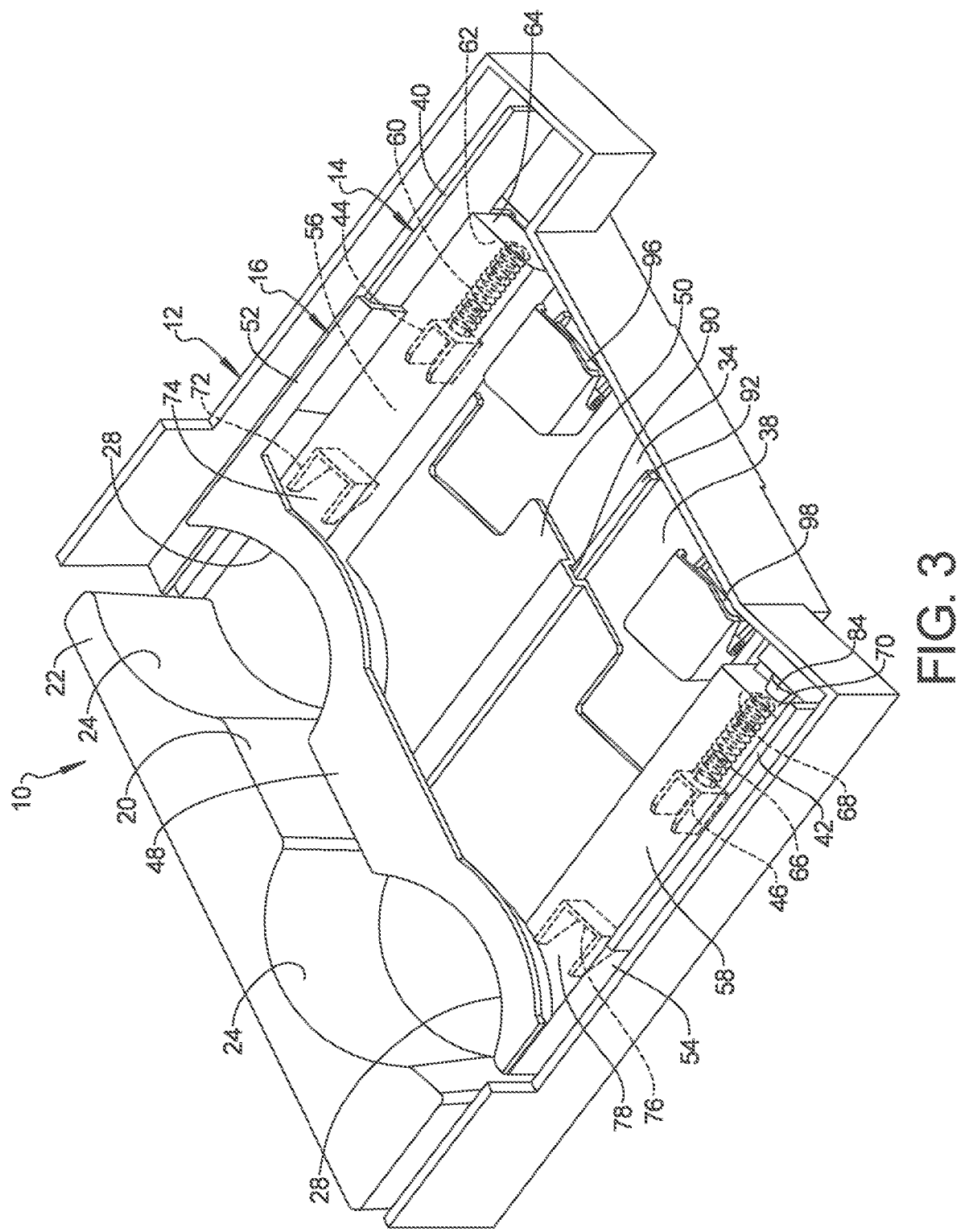
FIG. 3 is another perspective view of the cup holder shown in FIG. 2, wherein the cup support is in a closed position and a tray is in a recessed position.
Figure 4:
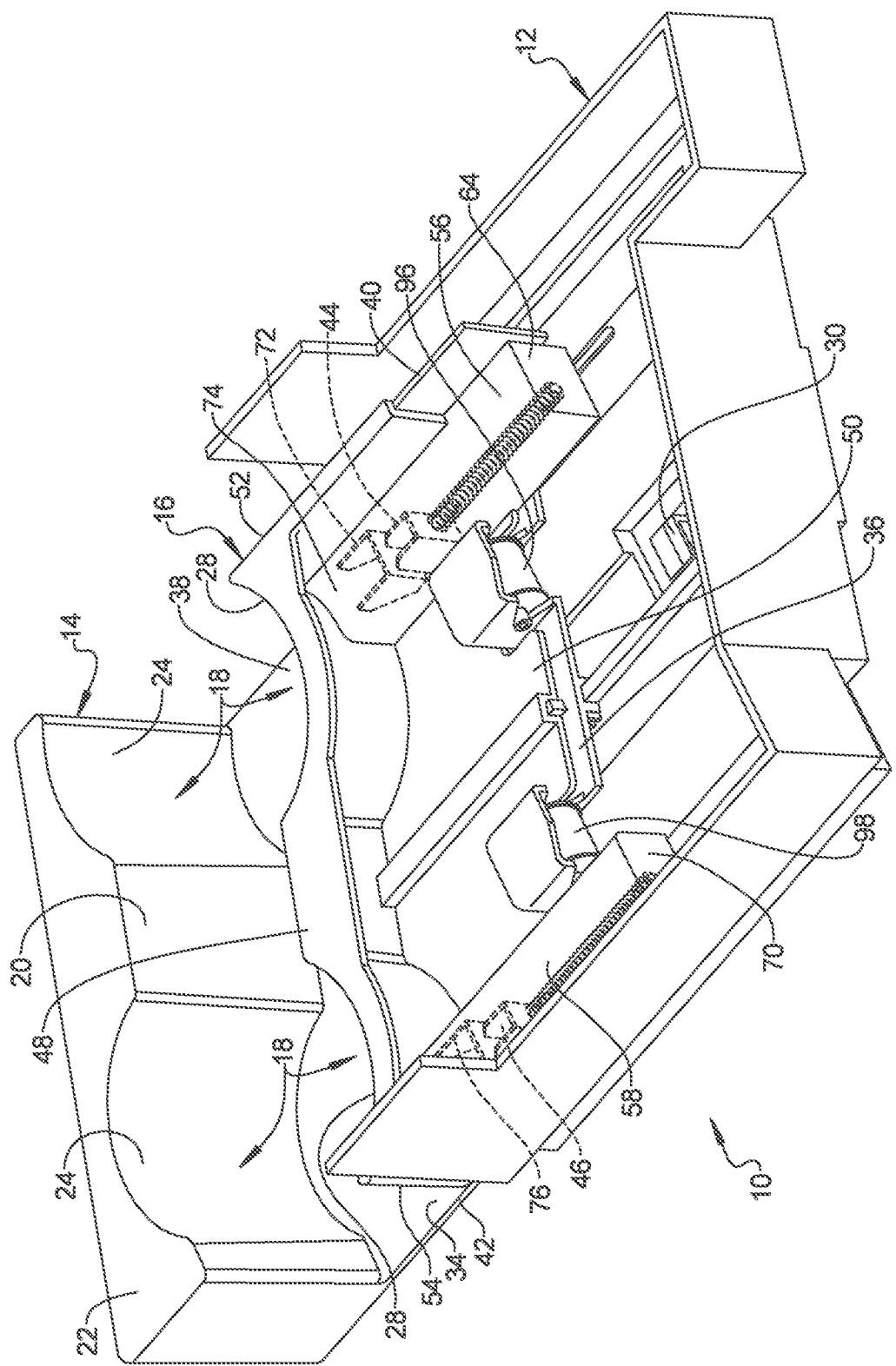
FIG. 4 is a perspective view of the cup holder shown in FIG. 2, wherein the cup support is in an open position and the tray is in the extended position.
Figure 5:
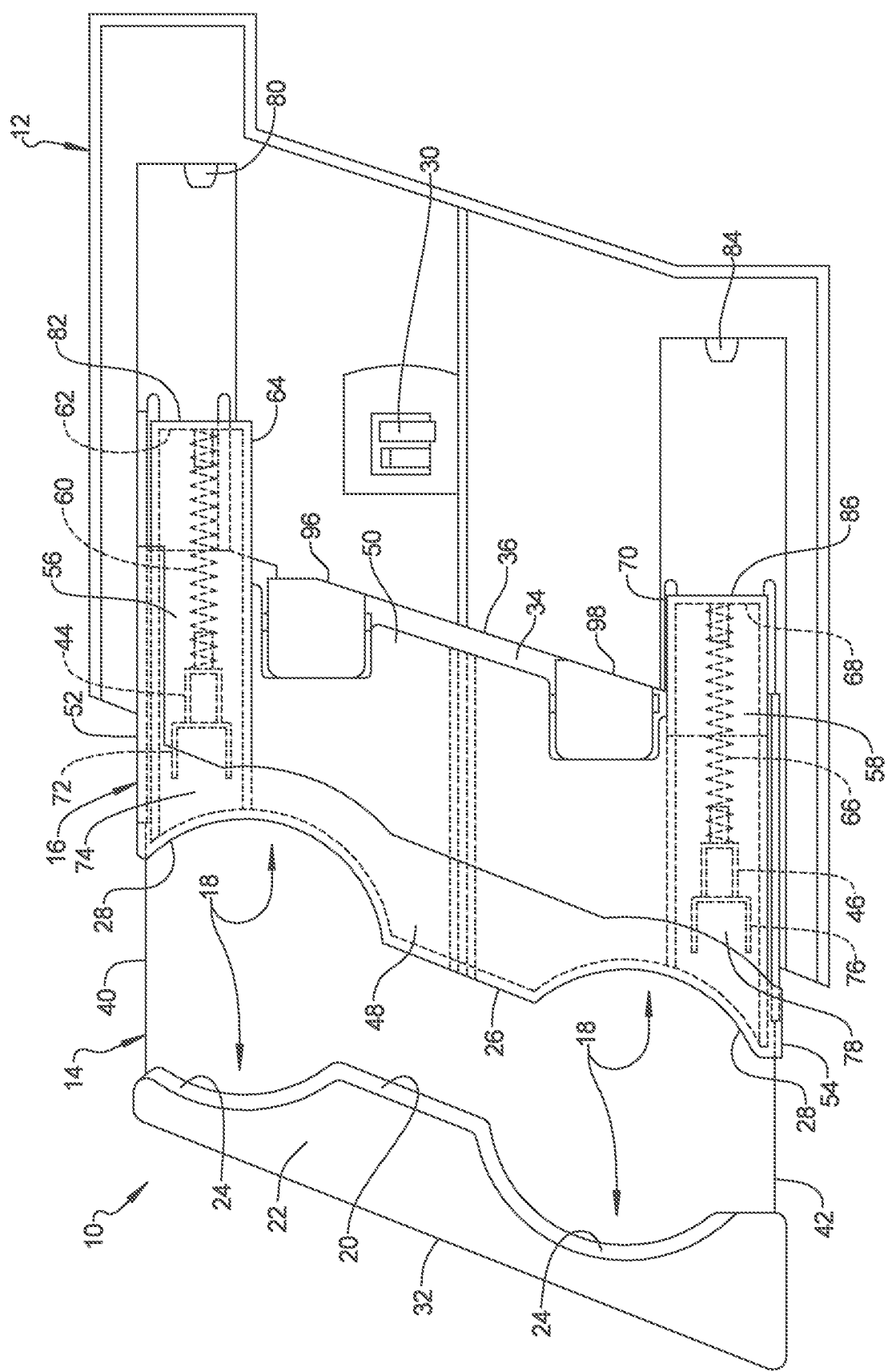
FIG. 5 is a top view of the cup holder shown in FIG. 4.

Referring to the Figures, a collapsible cup holder 10 in accordance with the present invention includes a base 12, a tray 14 and a cup support 16. The base 12 is adapted to fit within the dash-board of an automobile. The tray 14 is slidably supported on the base 12. The tray 14 is slidable between a recessed position, as shown in FIG. 1a, FIG. 1b, FIG. 2, and FIG. 3, and an extended position, as shown in FIG. 4 and FIG. 5. In the recessed position the tray 14 is recessed within the base 12. In the extended position, the tray 14 extends laterally outward from the base 12.

The cup support 16 is slidably supported on the tray 14. The cup support 16 is slidable between an open position relative to the tray 14, as shown in FIG. 1a, FIG. 1b, FIG. 2, and FIG. 3, and a closed position relative to the tray, as shown in FIG. 4 and FIG. 5. When the cup support 16 is in the open position, the cup support 16 and the tray 14 define a space 18 adapted to removably receive a beverage container. As shown, an inner surface 20 of a front 22 of the tray 14 includes curved pockets 24 and a front surface 26 of the cup support 16 includes corresponding, aligned curved pockets 28. When the cup support 16 is in the open position, the front surface 26 of the cup support 16 and the inner surface 20 of the front 22 of the tray 14 are spaced apart and the curved pockets 24, 28 formed within the inner surface 20 of the front 22 of the tray 14 and the front surface 26 of the cup support 16 define two spaces 18 adapted the secure a beverage container therein. When the cup support 16 is in the closed position, the front surface 26 of the cup support 16 and the inner surface 20 of the front 22 of the tray 14 are in close proximity, and the space between the curved pockets 24, 28 formed within the inner surface 20 of the front 22 of the tray 14 and the front surface 26 of the cup support 16 is not able to receive a beverage container therein.

When the tray 14 is moved from the extended position to the recessed position, the cup support 16 is adapted to move from the open position to the closed position. The tray 14 and the cup support 16 fit within the base 12 in an overlapping relationship.

In an exemplary embodiment, the cup support 16 is biased toward the open position relative to the tray 14. In addition, the tray 14 is biased toward the extended position relative to the base 12. A latching mechanism 30 is mounted within the base 12 and adapted to engage the tray 14 when the tray 14 is moved to the recessed position to secure the tray 14 and the cup support 16 within the base 12. The latching mechanism 30 is a known push-to-open, push-to-close type latching mechanism 30. When the tray 14 is pushed from the extended position to the recessed position, the latching mechanism 30 engages the tray 14 to secure the tray 14 in the recessed position. When the tray 14 is in the recessed position, a push against an outer surface 32 of the front 22 of the tray 14 will cause the tray 14 to recess slightly further within the base 12, causing the latching mechanism 30 to release and allowing the tray 14 to be biased outward to the extended position.

The tray 14 includes a bottom plate 34 having a rear 36, a top surface 38, a first side 40, and a second side 42. A first spring support 44 extends vertically from the top surface 38 of the bottom plate 34 adjacent the first side 40 of the tray 14. A second spring support 46 extends vertically from the top surface 38 of the bottom plate 34 adjacent the second side 42 of the tray 14.

The cup support 16 includes a front 48, a rear 50, a first side 52, and a second side 54. A first channel 56 extends parallel to and adjacent the first side 52 of the cup support 16. A second channel 58 extends parallel to and adjacent the second side 54 of the cup support 16.

The first spring support 44 of the tray 14 extends vertically into the first channel 56 of the cup support 16. A first spring 60 is positioned within the first channel 56 between the first spring support 44 and an inner surface 62 of a first end 64 of the first channel 56. The second spring support 46 extends vertically into the second channel 58 of the cup support 16. A second spring 66 is positioned within the second channel 58 between the second spring support 46 and an inner surface 68 of a first end 70 of the second channel 58. The first and second springs 60, 66 bias the cup support 16 to the open position relative to the tray 14.

The first channel 56 includes a first contact 72 formed at a second end 74 of the first channel 56. The second channel 58 includes a second contact 76 formed at a second end 78 of the second channel 58. When the cup support 16 is in the closed position, as shown in FIG. 2, there is space between the first contact 72 of the first channel 56 and the first spring support 44, and there is space between the second contact 76 of the second channel 58 and the second spring support 46. When the cup support 16 is in the open position, as shown in FIG. 5, the first contact 72 engages the first spring support 44, and the second contact 76 engages the second spring support 46 to provide a positive stop. The first and second springs 60, 66 bias the cup support 16 toward the open position and bias the first and second contacts 72, 76 of the first and second channels 56, 58 into engagement with the first and second spring supports 44, 46.

The base 12 includes a first stop 80 adapted to engage an outer surface 82 of the first end 64 of the first channel 56 of the cup support 16 when the cup support 16 is in the closed position. The base 12 includes a second stop 84 adapted to engage an outer surface 86 of the first end 70 of the second channel 58 of the cup support 16 when the cup support 16 is in the closed position. When the tray 14 is moved from the extended position toward the recessed position, the first and second springs 60, 66 bias the tray 14 and the cup support 16 to the open position, and the tray 14 and the cup support 16 move unitarily, in the open position, relative to the base 12 until the cup support 16 engages the first and second stops 80, 84. Once the cup support 16 engages the first and second stops 80, 84, the cup support 16 cannot move further relative to the base 12, and further movement of the tray 14 toward the recessed position, overcoming the bias of the first and second springs 60, 66, causes the cup support 16 to move relative to the tray 14 toward the closed position. When the tray 14 is moved to the recessed position within the base, the cup support 16 is in the closed position relative to the tray 14.

In an exemplary embodiment, the first and second stops 80, 84 are made from a compressible material to provide a soft contact when the cup support 16 engages the stops 80, 84. Further, when the latching mechanism 30 secures the tray 14 within the base 12, the tray 14 is held against the first and second stops 80, 84 whereby the first and second stops 80, 84 maintain contact with the tray 14 and prevent the tray 14 from vibration or rattling within the base 12 when the tray 14 is in the recessed position. In addition, when pressure is put on the front 22 of the tray 14, the first and second stops 80, 84 will compress further to allow slight movement of the tray 14 further into the base 12 to allow the latching mechanism 30 to release.

The tray 14 and the cup support 16 are slidable along a common horizontal longitudinal axis 88. The cup support 16 includes a center channel 90 formed therein. The tray 14 includes a ridge 92 extending vertically up from the top surface 38 that is slidably received within the center channel 90 formed within the cup support 16 to maintain alignment of the tray 14 and the cup support 16. As shown, the outer surface 32 of the front 22 of the tray 14 defines an angle 94 relative to the longitudinal horizontal axis 88 that is less than 90 degrees. This allows the cup holder 10 to be used in an automobile where the dash-board is not perfectly perpendicular to a center axis of the vehicle. It should be understood, that the dash-board of the automobile could possibly be perpendicular to the center axis of the automobile, wherein the outer surface 32 of the front 22 of the tray 14 would be perpendicular to the longitudinal horizontal axis 88.

In an exemplary embodiment, the collapsible cup holder 10 includes a pair of constant force extension springs 96, 98. Referring the Figures, and particularly to FIG. 4, a first constant force extension spring 96 is mounted on the bottom plate 34 of the tray 14, adjacent the rear 36 of the bottom plate 34 between the first side 40 of the bottom plate 34 and the center channel 90. The first constant force extension spring 96 is operationally attached to the base 12 to bias the tray 14 to the extended position. A second constant force extension spring 98 is mounted on the bottom plate 34 of the tray 14, adjacent the rear 36 of the bottom plate 34 between the second side 42 of the bottom plate 34 and the center channel 90. The second constant force extension spring 98 is also operationally attached to the base 12 to bias the tray 14 to the extended position. The first and second constant force extension springs 96, 98, operate together to bias the tray 14 to the extended position relative to the base 12.

When the tray 14 is in the recessed position, and secured within the base 12 by the latching mechanism 30, the first and second constant force extension springs 96, 98 are extended between the base 12 and the tray 14. When the front 22 of the tray 14 is pushed and the latching mechanism 30 releases, the first and second constant force extension springs 96, 98 act to bias the tray 14 outward from the base 12 to the extended position. As the tray 14 is biased toward the extended position, simultaneously, the first and second springs 60, 66 within the first and second channels 56, 58 of the cup support 16 bias the cup support 16 toward the open position relative to the tray 14.

As the tray 14 moves further toward the extended position, once the cup support 16 is in the open position relative to the tray 14, the first and second spring supports 44, 46 engage the first and second contacts 72, 76 to prevent further movement of the cup support 16 relative to the tray 14. At this point, the tray 14 and the cup support 16 move unitarily further outward from the base 12 until the tray 14 is in the extended position.

A collapsible cup holder 10 of the present disclosure offers the advantage of including a separate tray 14 and cup support 16 that collapse into the base 12 in an overlapping manner to allow the cup holder 10 to recess within the base 12 and take up less space behind the dash-board. Because the tray 14 and the cup support 16 collapse in an overlapping manner, the base 12 can be made more compact, taking up less space within the automobile.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A collapsible cup holder for an automobile, comprising:
a base;
a tray slidably supported on the base and slidable between an extended position, wherein the tray extends laterally outward from the base, and a recessed position, wherein the tray is recessed within the base, the tray including a bottom plate having a front, a rear, a first side, a second side, a first spring support extending vertically from a top surface of the bottom plate adjacent the first side of the tray, and a second spring support extending vertically from the top surface of the bottom plate adjacent the second side of the tray; and
a cup support slidably supported on the tray and slidable between an open position relative to the tray, wherein the cup support and the tray define a space adapted to removably receive a beverage container, and a closed position relative to the tray, the cup support including a front, a rear, a first side, a second side, a first channel extending parallel to and adjacent the first side of the cup support, a second channel extending parallel to and adjacent the second side of the cup support, a first spring positioned within the first channel between the first spring support and an inner surface of a first end of the first channel, and a second spring positioned within the second channel between the second spring support and an inner surface of a first end of the second channel, wherein, the first spring support extends vertically into the first channel and the second spring support extends vertically into the second channel, the first and second springs adapted to bias the cup support to the open position relative to the tray;
wherein when the tray is moved from the extended position to the recessed position, the cup support is adapted to move from the open position to the closed position, and to fit within the base in an overlapping relationship with the tray.

2. The collapsible cup holder of claim 1, wherein the base includes a stop adapted to engage the cup support, wherein when the tray is moved from the extended position toward the recessed position, the tray and the cup support move unitarily relative to the base until the cup support contacts the stop, and further movement of the tray toward the recessed position after the cup support contacts the stop causes the tray to move relative to the cup support, and when the tray is moved to the recessed position within the base, the cup support is in the closed position relative to the tray.

3. The collapsible cup holder of claim 2, wherein the stop is made from a compressible material to provide a soft contact when the cup support engages the stop.

4. The collapsible cup holder of claim 2, further including a latching mechanism mounted within the base and adapted to engage the tray when the tray is moved to the recessed position.

5. The collapsible cup holder of claim 1, further including a first spring positioned between the cup support and the tray, the first spring adapted to bias the cup support to the open position.

6. The collapsible cup holder of claim 1, wherein the first channel includes a first contact formed at a second end of the first channel and the second channel includes a second contact formed at a second end of the second channel, the first contact adapted to engage the first spring support and the second contact adapted to engage the second spring support when the cup support is in the open position relative to the tray.

7. The collapsible cup holder of claim 1, wherein the base includes a first stop adapted to engage an outer surface of the first end of the first channel of the cup support when the cup support is in the closed position and a second stop adapted to engage an outer surface of the first end of the second channel of the cup support when the cup support is in the closed position, wherein, when the tray is moved from the extended position toward the recessed position, the tray and the cup support move unitarily relative to the base until the cup support contacts the first and second stops, and further movement of the tray toward the recessed position after the cup support contacts the first and second stops causes the tray to move relative to the cup support tray, and when the tray is moved to the recessed position within the base, the cup support is in the closed position relative to the tray.

8. The collapsible cup holder of claim 2, wherein the stop comprises a first stop and a second stop made from a compressible material to provide a soft contact when the cup support engages the first and second stops.

9. The collapsible cup holder of claim 1, further including at least one constant force extension spring positioned between the tray and the base and adapted to bias the tray toward the extended position relative to the base.

10. The collapsible cup holder of claim 1, wherein the tray includes a bottom plate having a front, a rear, a top surface, a first side, a second side, and a ridge extending vertically from the top surface, and the cup support includes a center channel formed therein, the vertically extending ridge of the tray being slidably received within the center channel formed within the cup support to maintain alignment of the tray and the cup support.

11. The collapsible cup holder of claim 10, wherein the tray and the cup support are slidable along a longitudinal horizontal axis.

12. The collapsible cup holder of claim 11, wherein an outer surface of the front of the tray defines an angle relative to the longitudinal horizontal axis that is less than 90 degrees.

13. The collapsible cup holder of claim 10, further including a pair of constant force extension springs, a first constant force extension spring being mounted on the bottom plate of the tray, adjacent the rear of the bottom plate between the first side of the bottom plate and the center channel, operationally connected to the base, and a second constant force extension spring being mounted on the bottom plate of the tray, adjacent the rear of the bottom plate between the second side of the bottom plate and the center channel, operationally connected to the base, the first and second constant force extension springs being adapted to bias the tray to the extended position relative to the base.

14. A collapsible cup holder for an automobile, comprising:
a base;
a tray, the tray including a bottom plate having a front, a rear, a top surface, a first side, a second side, a first spring support extending vertically from a top surface of the bottom plate adjacent the first side of the tray, and a second spring support extending vertically from the top surface of the bottom plate adjacent the second side of the tray, the tray slidably supported on the base and slidable between an extended position, wherein the tray extends laterally outward from the base, and a recessed position, wherein the tray is recessed within the base;

a cup support slidably supported on the tray and slidable between an open position relative to the tray, wherein the cup support and the tray define a space adapted to removably receive a beverage container, and a closed position relative to the tray, the cup support including a front, a rear, a first side, a second side, a first channel extending parallel to and adjacent the first side of the cup support, a second channel extending parallel to and adjacent the second side of the cup support, a first spring positioned within the first channel between the first spring support of the tray and an inner surface of a first end of the first channel, and a second spring positioned within the second channel between the second spring support of the tray and an inner surface of a first end of the second channel, the first spring support extending vertically into the first channel and the second spring support extending vertically into the second channel, the first and second springs adapted to bias the cup support to the open position relative to the tray;

a latching mechanism mounted within the base and adapted to engage the tray when the tray is moved to the recessed position; and a pair of constant force extension springs, a first constant force extension spring being mounted on the bottom plate of the tray, adjacent the rear of the bottom plate between the first side of the bottom plate and the center channel, operationally connected to the base, and a second constant force extension spring being mounted on the bottom plate of the tray, adjacent the rear of the bottom plate between the second side of the bottom plate and the center channel, operationally connected to the base, the first and second constant force extension springs being adapted to bias the tray to the extended position relative to the base;

wherein when the tray is moved from the extended position to the recessed position, the cup support is adapted to move from the open position to the closed position, and to fit within the base in an overlapping relationship with the tray.

15. The collapsible cup holder of claim 14, wherein the first channel includes a first contact formed at a second end of the first channel and the second channel includes a second contact formed at a second end of the second channel, the first contact adapted to engage the first spring support and the second contact adapted to engage the second spring support when the cup support is in the open position relative to the tray.

16. The collapsible cup holder of claim 15, wherein the base includes a first stop adapted to engage an outer surface of the first end of the first channel of the cup support when the cup support is in the closed position and a second stop adapted to engage an outer surface of the first end of the second channel of the cup support when the cup support is in the closed position, wherein, when the tray is moved from the extended position toward the recessed position, the tray and the cup support move unitarily relative to the base until the cup support contacts the first and second stops, and further movement of the tray toward the recessed position after the cup support contacts the first and second stops causes the tray to move relative to the cup support tray, and when the tray is moved to the recessed position within the base, the cup support is in the closed position relative to the tray.

17. The collapsible cup holder of claim 16, wherein the tray includes a ridge extending vertically from the top surface, and the cup support includes a center channel, the vertically extending ridge slidably received within the center channel formed within the cup support to maintain alignment of the tray and the cup support.

18. The collapsible cup holder of claim 17, wherein the tray and the cup support are slidable along a longitudinal horizontal axis.

19. The collapsible cup holder of claim 18, wherein an outer surface of the front of the tray defines an angle relative to the longitudinal horizontal axis that is less than 90 degrees.

* * * * *